United States Patent
Noguchi (10) Patent No.: US 10,011,217 B2
(45) Date of Patent: Jul. 3, 2018

(54) TURN SIGNAL SWITCH DEVICE

(71) Applicant: ALPS ELECTRIC CO., LTD., Tokyo (JP)

(72) Inventor: Takashi Noguchi, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/446,366

(22) Filed: Mar. 1, 2017

(65) Prior Publication Data

US 2017/0267165 A1    Sep. 21, 2017

(30) Foreign Application Priority Data

Mar. 16, 2016   (JP) ................................ 2016-052856

(51) Int. Cl.
*H01H 3/16* (2006.01)
*B60Q 1/42* (2006.01)
*H01H 21/24* (2006.01)

(52) U.S. Cl.
CPC ............... *B60Q 1/42* (2013.01); *B60Q 1/425* (2013.01); *H01H 21/24* (2013.01)

(58) Field of Classification Search
CPC ............ H01H 21/24; H01H 3/00; H01H 3/02; H01H 3/04; H01H 3/06; H01H 3/32; H01H 21/00; H01H 21/02; H01H 21/04; H01H 21/22; H01H 21/285; H01H 21/36; H01H 21/54; H01H 2003/00; H01H 2003/02; H01H 2009/066; H01H 2221/00; H01H 2221/016; H01H 2221/024; H01H 2221/03; B60Q 1/42
USPC ....................................................... 200/61.35
See application file for complete search history.

(56) References Cited

U.S. PATENT DOCUMENTS 5,030,802 A * 7/1991 Noro ...................... B60Q 1/425
200/61.27

FOREIGN PATENT DOCUMENTS

JP     2012-195103     10/2012

* cited by examiner

*Primary Examiner* — Anthony R. Jimenez
(74) *Attorney, Agent, or Firm* — Brinks Gilson & Lione (57) ABSTRACT

A turn signal switch device has a manipulation lever and a cancel lever that can advance and retract to and from the rotation path of a cancel protrusion, which is shaped like a sector and rotates together with a shaft. A cancel protrusion engaging part that engages a cancel protrusion is formed at the front end of the cancel lever. The cancel protrusion engaging part is disposed at a position offset from the lever body of the cancel lever in the axial direction of the shaft.

3 Claims, 10 Drawing Sheets

TURN SIGNAL SWITCH DEVICE

CLAIM OF PRIORITY

This application claims benefit of priority to Japanese Patent Application No. 2016-052856 filed on Mar. 16, 2016, which is hereby incorporated by reference in its entirety.

BACKGROUND

1. Field of the Disclosure

The present disclosure relates to a turn signal switch device having a manipulation lever that is manipulated so as to swing to a left-turn indicating position and a right-turn indicating position with a neutral position intervening between them, and more particularly to a turn signal switch device having a function that automatically returns the manipulation lever to the neutral position when a steering wheel is rotated in a direction reverse to the turn direction after the manipulation lever has been manipulated so as to swing.

2. Description of the Related Art

A turn signal switch device assembled in the steering column of a vehicle switches the indication of a direction indicator of the vehicle from the neutral position to the left-turn indicating position or right-turn indicating position when a manipulation lever is swung.

When the manipulation lever attached to the turn signal switch device is swung from the neutral position to the left-turn indicating position or right-turn indicating position, the left-turn indicating lamp or right-turn indicating lamp can be made to blink.

A cancel cam member is attached to the steering column. The cancel cam member swings in synchronization with a rotation of a steering shaft. A cancel lever that engages the cancel cam is attached to the turn signal switch device. The cancel lever automatically returns the manipulation lever from the left-turn indicating position or right-turn indicating position to the neutral position.

Japanese Unexamined Patent Application Publication No. 2012-195103, for example, discloses this type of turn signal switch device, which has a function that automatically returns the manipulation lever to the neutral position.

In the turn signal switch device disclosed in Japanese Unexamined Patent Application Publication No. 2012-195103, the cancel lever is formed in a straight shape. Therefore, the cancel cam member has been assembled to the steering shaft so that the position of a cancel protrusion on the cancel cam member matches the position of the front end of the cancel lever. In this structure in which the cancel cam member is assembled to the steering shaft with the cancel cam member aligned to the front end of the cancel lever, another part can be assembled to the steering shaft only at a limited position. Therefore, there has been a problem in that the entire width of all parts attached to the steering column in its axial direction becomes large.

SUMMARY

A turn signal switch device has a manipulation lever swingable to a left-turn indicating position or a right-turn indicating position through a neutral position, the manipulation lever being automatically returned to the neutral position from the left-turn indicating position or right-turn indicating position as a steering shaft is rotated. The turn signal switch device has a holding body that holds the bottom end of the manipulation lever. The holding body is swingable together with the manipulation lever. A housing that swingably supports the holding body, and a cancel lever supported by a lever guide member are attached to the housing so that the front end of the cancel lever is movable toward and away from the steering shaft when the manipulation lever is manipulated so as to swing. A cancel protrusion engaging part is disposed at the front end of the cancel lever so as to be able to advance and retract to and from the rotation path of the cancel protrusion of a cancel cam member that rotates together with the steering shaft. The cancel protrusion engaging part is disposed at a position offset from the lever body of the cancel lever in the axial direction of the steering shaft.

In this structure, since the cancel protrusion of the cancel cam member to be assembled to the steering shaft does not need to be aligned to the lever body of the cancel lever, the degree of freedom in the assembling of another part to the steering shaft can be assured, enabling a reduction in the entire width of all parts attached to the steering column in its axial direction.

DESCRIPTION OF THE EXEMPLARY EMBODIMENTS

Figure 1:
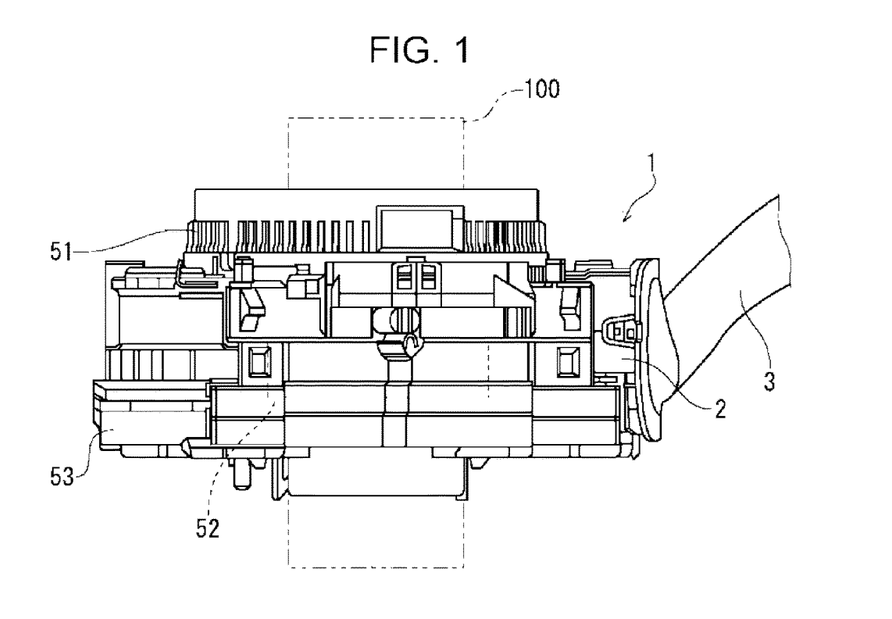
FIG. 1 is a side view indicating a state in which a turn signal switch device in an embodiment of the present invention, a rotational connector, and a rotational angle detecting device have been assembled to a steering shaft.
Figure 2:
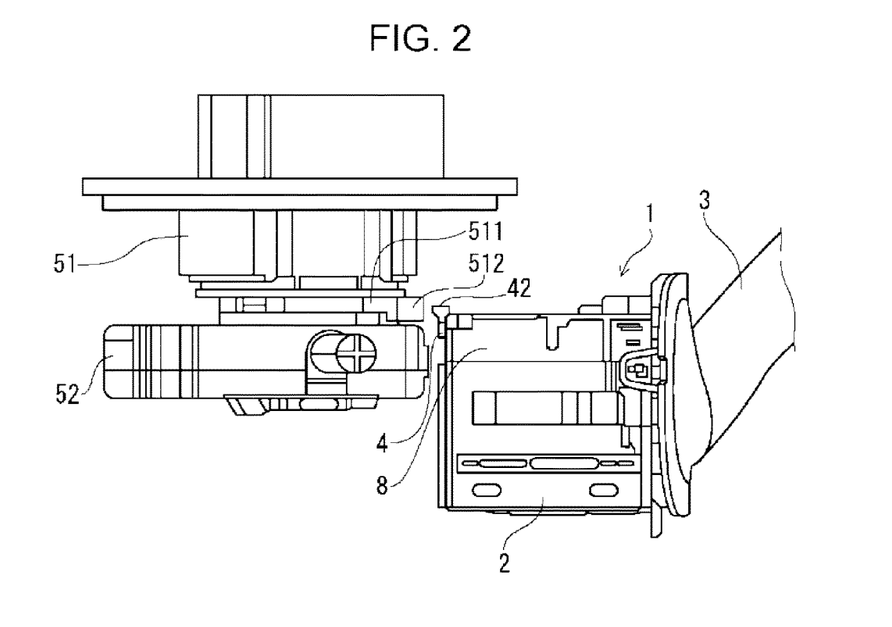
FIG. 2 is a side view illustrating a positional relationship among the turn signal switch device, rotational connector, and rotational angle detecting device illustrated in FIG. 1.
Figure 3:
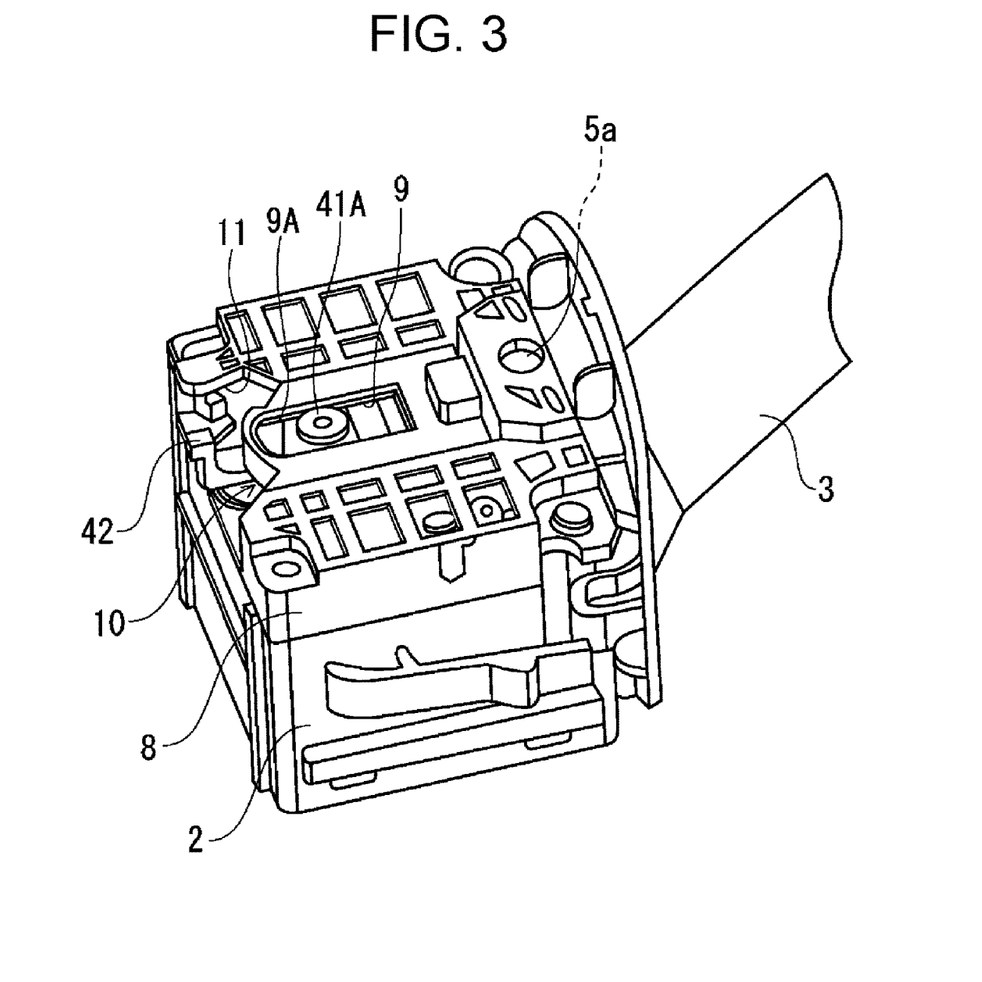
FIG. 3 is a perspective view of the turn signal switch device.
Figure 4:
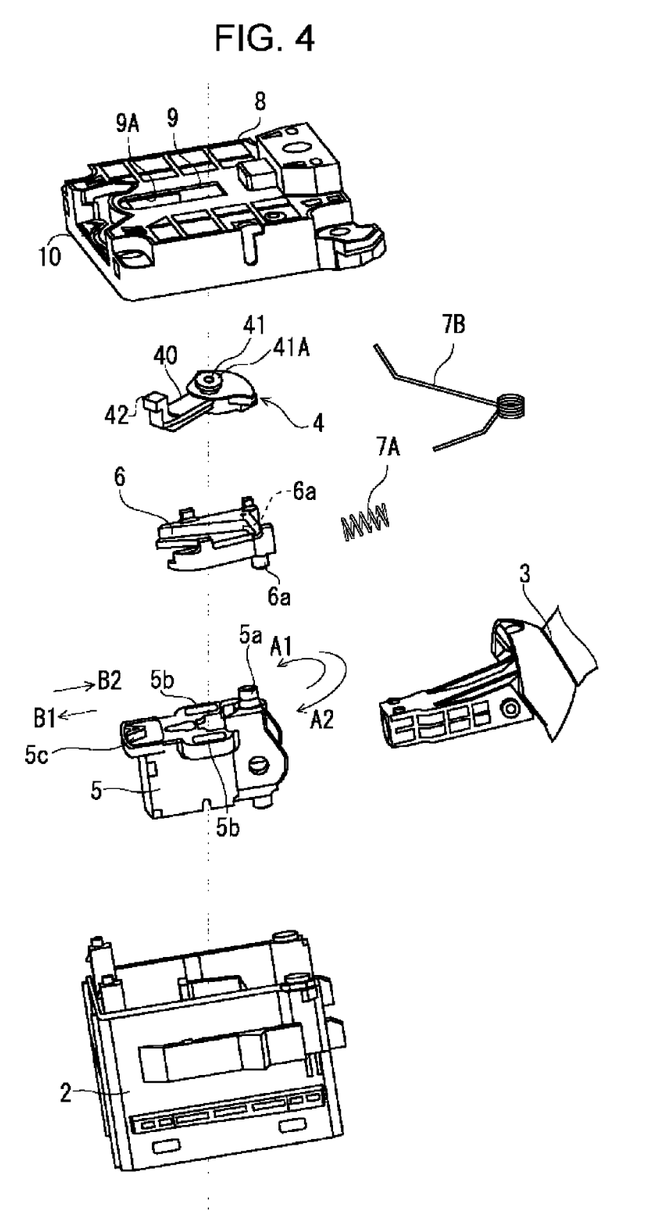
FIG. 4 is an exploded perspective view of main parts of the turn signal switch device.
Figure 5:
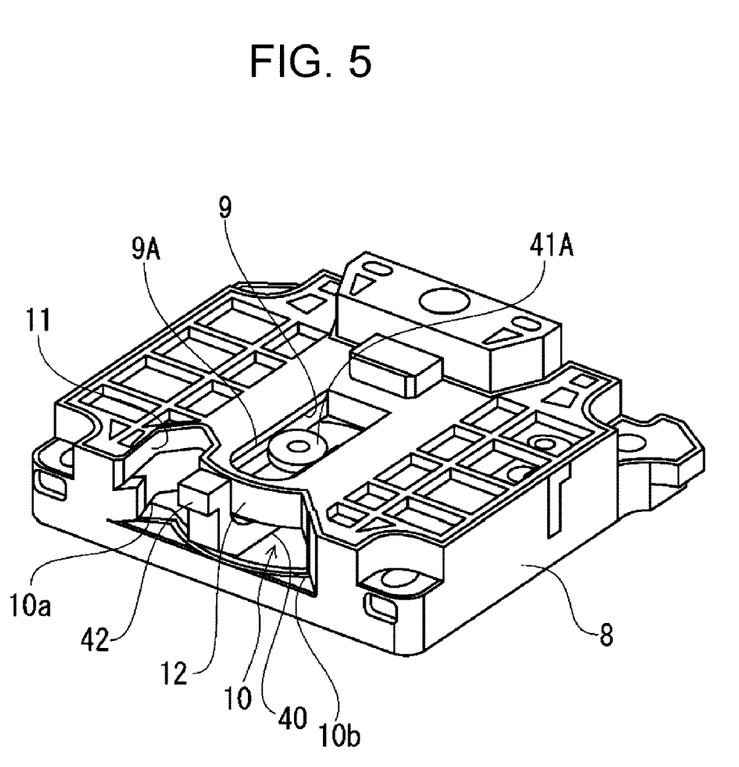
FIG. 5 is an enlarged perspective view illustrating a state in which a cancel lever has been assembled to a lever guide member.
Figure 6:
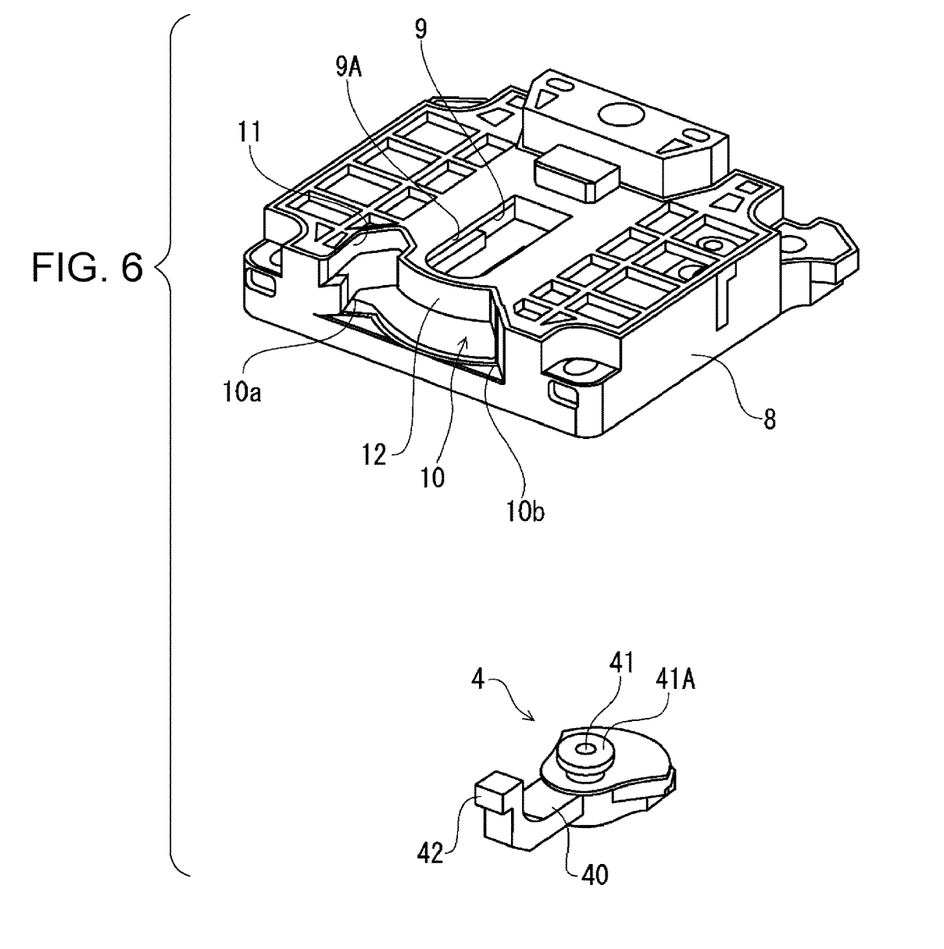
FIG. 6 is an enlarged exploded perspective view of the cancel lever and lever guide member.
Figure 7:
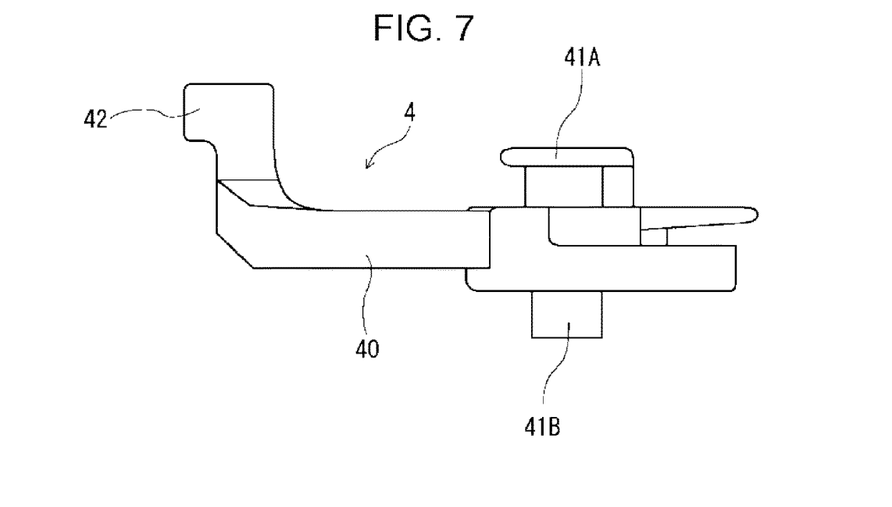
FIG. 7 is an enlarged side view of the cancel lever.
Figure 8:
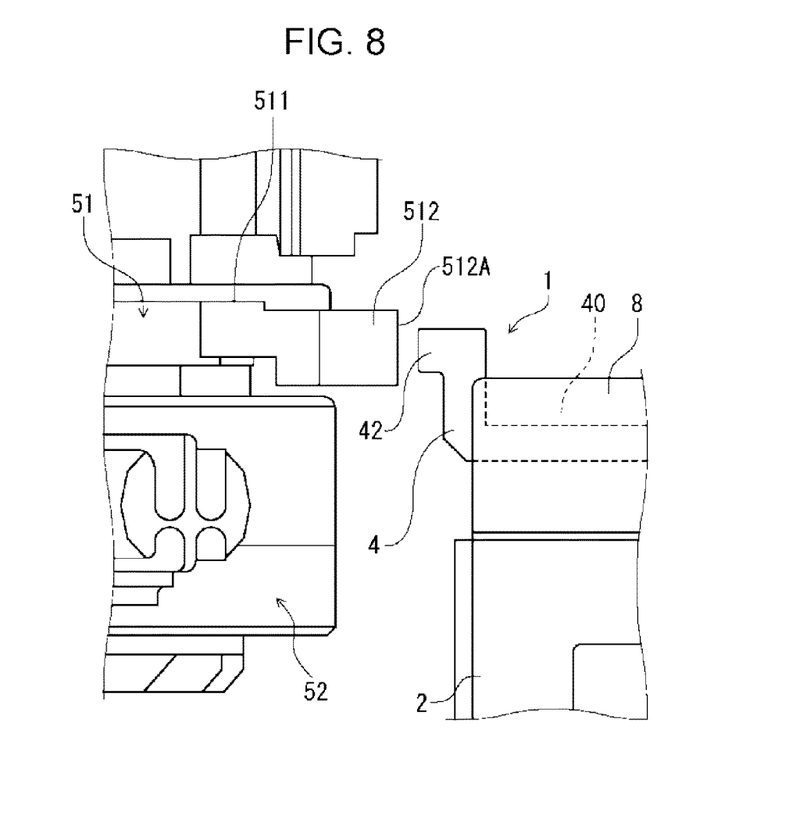
FIG. 8 is an enlarged side view illustrating a relationship between the cancel protrusion engaging part of the cancel lever and a cancel protrusion.
Figure 9A:
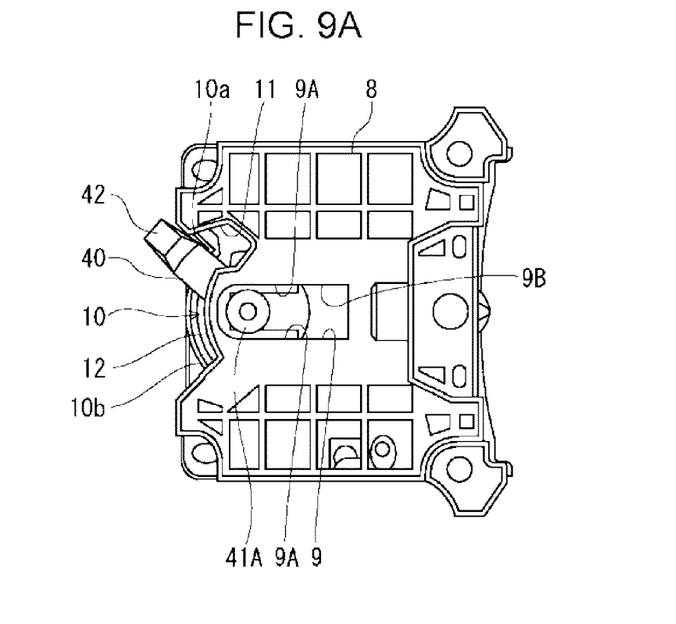
FIGS. 9A and 9B are enlarged plan views illustrating the operational range (movable area) of the cancel lever, FIG. 9A illustrating a state in which the cancel lever has moved toward a right-turn indicating position, FIG. 9B illustrating a state in which the cancel lever has moved toward a left-turn indicating position.
Figure 9B:
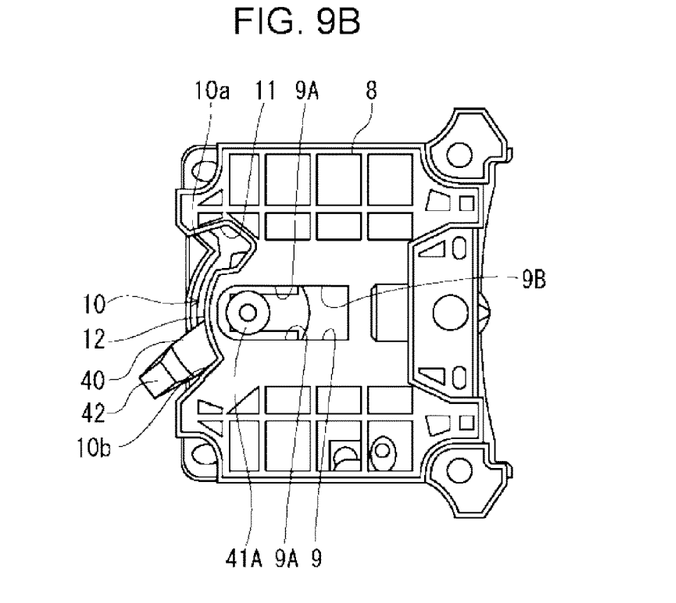
Figure 10:
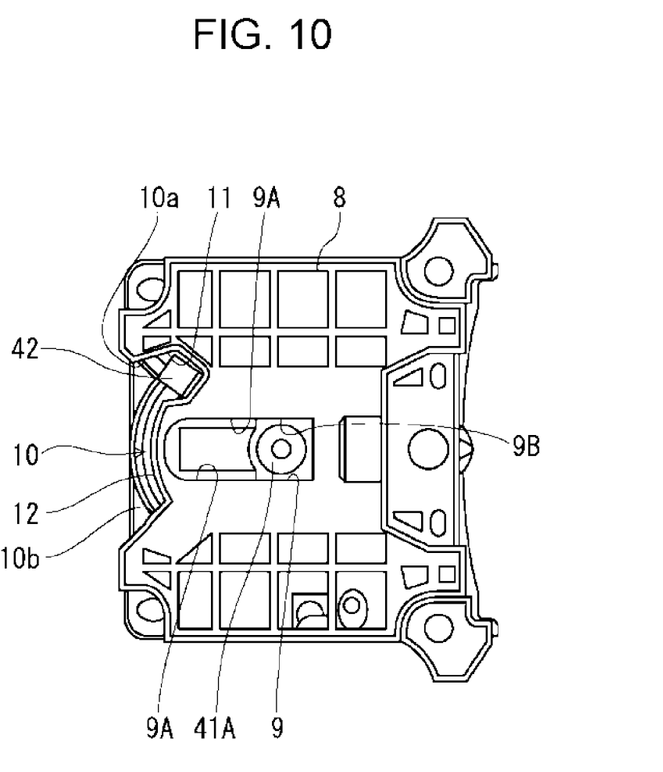
FIG. 10 is an enlarged plan view illustrating a state in which the cancel lever is to be assembled to the lever guide member.

A turn signal switch device in an embodiment of the present invention will be described with reference to the drawings. FIG. 1 is a side view indicating a state in which a turn signal switch device in an embodiment of the present invention, a rotational connector, and a rotational angle detecting device have been assembled to a steering shaft. FIG. 2 is a side view illustrating a positional relationship among the turn signal switch device, rotational connector, and rotational angle detecting device illustrated in FIG. 1. FIG. 3 is a perspective view of the turn signal switch device. FIG. 4 is an exploded perspective view of main parts of the turn signal switch device. FIG. 5 is an enlarged perspective view illustrating a state in which a cancel lever has been assembled to a lever guide member. FIG. 6 is an enlarged exploded perspective view of the cancel lever and lever guide member. FIG. 7 is an enlarged side view of the cancel lever. FIG. 8 is an enlarged side view illustrating a relationship between the cancel protrusion engaging part of the cancel lever and a cancel protrusion. FIGS. 9A and 9B are enlarged plan views illustrating the operational range (movable area) of the cancel lever; FIG. 9A illustrates a state in which the cancel lever has moved toward a right-turn indicating position; FIG. 9B illustrates a state in which the cancel lever has moved toward a left-turn indicating position. FIG. 10 is an enlarged plan view illustrating a state in which the cancel lever is to be assembled to the lever guide member.

Turn Signal Switch Device

As illustrated in FIGS. 1 to 4, the turn signal switch device 1 is a part attached to a steering column. The turn signal switch device 1 is assembled to a steering shaft 100 (referred to below as the shaft 100) together with, for example, a rotational connector 51 and a rotational angle detecting device 52, which detects the rotational angle of a steering wheel (not illustrated).

The rotational connector 51 and rotational angle detecting device 52 are assembled to the shaft 100 so as to be overlapped in its axial direction.

The rotational connector 51 electrically connects electronic devices (not illustrated), such as a switch and the like, attached to the shaft 100 to a control device (not illustrated) mounted in a vehicle through wiring cords.

The turn signal switch device 1 is attached to a frame body 53, which supports the rotational connector 51 and rotational angle detecting device 52.

The turn signal switch device 1 has a manipulation lever 3 disposed so that its front end protrudes outwardly from a housing 2, a holding body 5 to which the bottom end of the manipulation lever 3 is attached, the holding body 5 being configured to swingably hold the manipulation lever 3 around the rotational axis 5a of the holding body 5, the housing 2 that is assembled to the frame body 53 and supports the holding body 5 so as to be swingable around the rotational axis 5a together with the manipulation lever 3, and a cancel lever 4 that is movable due to the swinging of the holding body 5 disposed in the housing 2, the cancel lever 4 being able to advance and retract to and from the rotation path of a cancel protrusion 512, which is shaped like a sector and rotates together with the shaft 100. The front end of the cancel lever 4 protrudes from the housing 2 toward the shaft 100.

The cancel protrusion 512 is formed on the outer periphery of a cancel cam member 511 formed in a ring shape, which is part of the rotational connector 51. The cancel cam member 511 rotates together with the shaft 100, and the cancel protrusion 512 also rotates together with the cancel cam member 511.

The manipulation lever 3 is supported by the housing 2 so as to be swingable around the rotational axis 5a together with the holding body 5 in the direction indicated by the arrow A1 or A2 in FIG. 4. When the manipulation lever 3 is swung in the direction indicated by the arrow A1 or A2 in FIG. 4, the manipulation lever 3 is locked by a latch mechanism (not illustrated) at the left-turn indicating position or right-turn indicating position. Then, the turn signal switch device 1 sends a left-turn indicating output or right-turn indicating output to a control unit (not illustrated) provided in the vehicle.

The cancel lever 4 is driven when the manipulation lever 3 is manipulated and the steering wheel attached to the shaft 100 is manipulated so as to rotate.

The turn signal switch device 1 is characterized particularly in the cancel lever 4 and a lever guide plate 8.

Cancel Lever

As illustrated in FIG. 4, the cancel lever 4 is slidably caught and supported on a lever driving plate 6 disposed on the holding body 5. The cancel lever 4 is always urged by a torsion spring 7B in the direction indicated by the arrow B1 in FIG. 4.

Two guide protrusions 6a are formed on the lower surface of the lever driving plate 6. The two guide protrusions 6a fit into two guide slotted holes 5b formed in the upper surface of the holding body 5. The two guide protrusions 6a are movable along the two slotted holes 5b in the direction indicated by the arrow B1 or B2 in FIG. 4. In the description below, the direction indicated by the arrow B1 will be referred to below as the advancing direction of the cancel lever 4, and the direction indicated by the arrow B2 will be referred to below as the retracting direction of the cancel lever 4.

The lever driving plate 6 is always urged in the advancing direction with a strong force generated by a coiled spring 7A provided between the rear part of the lever driving plate 6 and the rotational axis 5a of the holding body 5. Usually, when the cancel lever 4 is rotated and the lever driving plate 6 is pressed, the lever driving plate 6 swings the holding body 5 at the end positions of the two slotted holes 5b in the advancing direction together with the holding body 5. However, if the cancel lever 4 is rotated in a state in which the holding body 5 cannot be swung because, for example, the manipulation lever 3 is held by a hand, when the lever driving plate 6 is pressed due to the rotation of the cancel lever 4, the lever driving plate 6 moves on the holding body 5 in the retracting direction against the force of the coiled spring 7A, so an overload applied to the cancel lever 4 is released. This mechanism is an example of a so-called cancel jam preventing mechanism.

When the manipulation lever 3 is manipulated so as to swing around the rotational axis 5a, the holding body 5 is also swung around the rotational axis 5a. Since, at that time, the restricting part 5c of the holding body 5 retracts from the front of a restricted part 41B (see FIG. 7) of the cancel lever 4 in the advancing direction, the cancel lever 4 becomes movable in the advancing direction. In this state, the cancel lever 4 is urged by the torsion spring 7B, so the front end of the cancel lever 4 advances until it protrudes outwardly from the housing 2.

As illustrated in FIGS. 5 to 7, the cancel lever 4 has a lever body 40, a lever moving guide axis part 41 formed at the bottom end of the lever body 40, and a cancel protrusion engaging part 42 formed at the front end of the lever body 40.

The cancel protrusion engaging part 42 is preferably provided at the front end of a substantially Z shape formed by bending the front end of the lever body 40 in the axial direction of the shaft 100 and further bending the front end of the lever body 40 in an inner radial direction of the shaft 100.

As illustrated in FIG. 8, the cancel protrusion engaging part 42 is disposed at a position offset from the lever body 40 in the axial direction of the shaft 100. When the turn signal switch device 1 is assembled to a steering column device 50, the cancel protrusion engaging part 42 is placed at a position at which the cancel protrusion engaging part 42 faces the cam surface 512A of the cancel protrusion 512.

In this structure, even if the cancel protrusion 512 of the cancel cam member 511 to be assembled to the shaft 100 is moved in the axial direction of the shaft 100, the cancel protrusion engaging part 42 of the cancel lever 4 can still be aligned to the cancel protrusion 512. That is, since the cancel protrusion 512 of the cancel cam member 511 to be assembled to the shaft 100 does not need to be aligned to the lever body 40 of the cancel lever 4, the degree of freedom in the assembling of the rotational angle detecting device 52 to the shaft 100 can be assured, enabling a reduction in the entire width of all parts attached to the steering column in its axial direction.

Since the cancel protrusion engaging part 42 can be formed just by bending the front end of the cancel lever 4, the cancel protrusion engaging part 42 can be formed easily.

Lever Guide Member

The lever guide plate 8, which works as a lever guide member, is attached to the upper portion of the housing 2, as illustrated in FIGS. 3 and 4. At the center of the lever guide plate 8, a lever guide slotted hole 9 is formed into which the lever moving guide axis part 41 of the cancel lever 4 fits. The lever guide slotted hole 9 supports the cancel lever 4 so as to be movable in the advancing direction or retracting direction.

A flange 41A is formed on the lever moving guide axis part 41 of the cancel lever 4. Two steps 9A are formed at both sides of the lever guide slotted hole 9 formed in the lever guide plate 8. The flange 41A of the cancel lever 4 fits to these steps 9A, preventing the cancel lever 4 from coming off from the lever guide plate 8.

In this structure, it is possible to accurately advance and retract the cancel protrusion engaging part 42 to and from the rotation path of the cancel protrusion 512.

The lever guide hole 10 shaped like an arc is preferably formed in the lever guide plate 8 on the same side as the shaft 100 so that the cancel protrusion engaging part 42 formed at the front end of the cancel lever 4 protrudes from the housing 2. The lever guide hole 10 preferably guides the lever body 40 so that the cancel protrusion engaging part 42 is swingable and movable reciprocally. The cancel protrusion engaging part 42 of the cancel lever 4 is driven so as to be swingable and movable reciprocally along the lever guide hole 10 in the lever guide plate 8. When the manipulation lever 3 is swung toward the right-turn indicating position, the cancel protrusion engaging part 42 is driven by the rotation of the cancel cam member 511 and is swung to one end 10a of the lever guide hole 10 as illustrated in FIG. 9A. When the manipulation lever 3 is swung toward the left-turn indicating position, the cancel protrusion engaging part 42 is swung to another end 10b of the lever guide hole 10 as illustrated in FIG. 9B. That is, a range from the one end 10a of the lever guide hole 10 to the other end 10b is the swinging range (driven area) of the cancel operation of the cancel protrusion engaging part 42.

An insertion hole 11 is preferably formed in the lever guide plate 8 at a position adjacent to the one end 10a of the lever guide hole 10 so as to communicate with the lever guide hole 10, as illustrated in FIG. 10. The insertion hole 11 functions when the cancel protrusion engaging part 42 is incorporated into the lever guide hole 10.

The cancel lever 4 is assembled to the lever guide plate 8 as described below. First, the cancel protrusion engaging part 42 formed by bending the front end of the cancel lever 4 is inserted into the insertion hole 11. Then, the cancel protrusion engaging part 42 is made to protrude from the lever guide hole 10 and the lever body 40 of the cancel lever 4 is moved along the lever guide hole 10. At that time, the flange 41A is incorporated by being passed through an insertion part 9B, which is part of the lever guide slotted hole 9 other than the two steps 9A. The flange 41A of the lever moving guide axis part 41 is fitted to these steps 9A in the lever guide slotted hole 9. This completes the assembling of the cancel lever 4 to the lever guide plate 8.

In this structure, even if the front end of the cancel lever 4 is bent so as to form the cancel protrusion engaging part 42, the cancel lever 4 can still be assembled to the lever guide plate 8 easily.

The insertion hole 11 in the lever guide plate 8 is preferably formed at a position outside the movable range of the cancel protrusion engaging part 42 in the lever guide hole 10. Therefore, when the cancel protrusion engaging part 42 swings along the lever guide hole 10, it is possible to prevent the cancel protrusion engaging part 42 from coming off the lever guide hole 10.

In this structure, after the cancel lever 4 has been assembled to the lever guide plate 8, the cancel lever 4 does not come off from the lever guide plate 8 while the cancel lever 4 is being driven, enabling the cancel lever 4 to be stably driven.

A lever locking part 12 is preferably formed on the side wall of the lever guide hole 10. The lever locking part 12 preferably stops the backward movement of the cancel protrusion engaging part 42.

In this structure, even if the cancel protrusion engaging part 42 is pushed backwardly, the cancel protrusion engaging part 42 is caught by the lever locking part 12, preventing the flange 41A of the cancel lever 4 from coming off from the lever guide slotted hole 9. Therefore, the cancel lever 4 and lever guide plate 8 can be assembled as a unit in which the cancel lever 4 is incorporated into the lever guide plate 8, so they can be assembled easily.

Operation

Figure 11A:
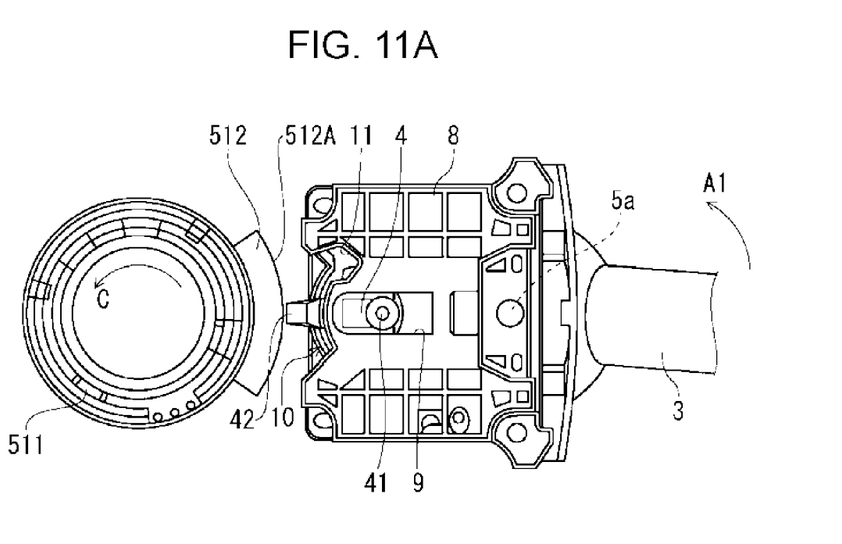
FIGS. 11A and 11B are enlarged plan views illustrating the operation of the cancel lever, FIG. 11A illustrating a state in which a manipulation lever is supported at a neutral position, FIG. 11B illustrating a state in which the manipulation lever is supported at a left-turn indicating position.

Next, the operation of the cancel lever 4 will be described with reference to FIGS. 11A and 11B. FIG. 11A is a plan view illustrating a state in which the manipulation lever 3 is placed at the neutral position, and FIG. 11B is a plan view illustrating a state in which the manipulation lever 3 has been manipulated so as to swing in the direction indicated by the arrow A1 and has been locked at the left-turn indicating position.

As illustrated in FIG. 11A, the cancel protrusion engaging part 42 of the cancel lever 4 protrudes from the housing 2 toward the shaft 100 and is supported at a position at which the cancel protrusion engaging part 42 faces the cancel protrusion 512. When, in this state, the manipulation lever 3 is manipulated so as to swing around the rotational axis 5a in the left-turn direction, indicated by the arrow A1 in FIG. 11A, the holding body 5 is also swung in the same direction as the manipulation lever 3. Then, the restricting part 5c (see FIG. 4) of the holding body 5 is swung and moves apart from a position in front of the restricted part 41B of the cancel lever 4, enabling the cancel lever 4 to advance.

When the driver rotates the steering wheel in the left-turn direction, the shaft 100 is rotated due to the rotation of the steering wheel and the cancel cam member 511 is rotated in the direction indicated by the arrow C in FIG. 11A. Due to the rotation of the cancel cam member 511, the cancel protrusion 512 is also rotated in the same direction as the cancel cam member 511. At that time, the cancel protrusion engaging part 42 of the cancel lever 4 is urged by the torsion spring 7B and slides on the cam surface 512A of the cancel protrusion 512.

Figure 11B:
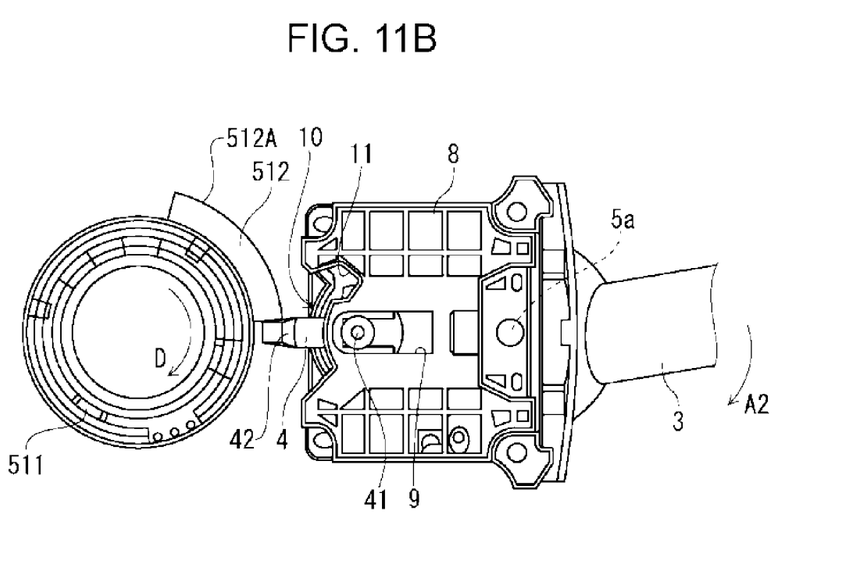

When the steering wheel continues to be rotated in the left-turn direction, indicated by the arrow C in FIG. 11A, the end of the cancel protrusion 512 moves to the position of the cancel protrusion engaging part 42 as illustrated in FIG. 11B. Due to the movement of the cancel protrusion 512 in the advancing direction, the cancel protrusion engaging part 42 advances to the rotation path of the cancel protrusion 512. The manipulation lever 3 is locked at the left-turn indicating position by a latch mechanism (not illustrated).

In the state illustrated in FIG. 11B, the driver rotates the steering wheel in the direction indicated by the arrow D in FIG. 11B to return the steering wheel to the neutral position. Due to the rotation of the steering wheel, the shaft 100 is also rotated in the direction indicated by the arrow D in FIG. 11B, and the cancel protrusion 512 swings the cancel protrusion engaging part 42, placing the cancel protrusion engaging part 42 in a state illustrated in FIG. 9B. Due to the swinging of the cancel protrusion engaging part 42, the cancel lever 4 swings the holding body 5 together with the lever driving plate 6, releasing the lock of the latch mechanism. Therefore, the holding body 5 is swung around the rotational axis 5a in the direction indicated by the arrow A2 in FIG. 11B. The manipulation lever 3 is automatically returned to the neutral position by the latch mechanism. During the return, the cancel protrusion engaging part 42 proceeds onto the cam surface 512A of the cancel protrusion 512 and slides on the cam surface 512A. Since the restricted part 41B of the cancel lever 4 is retracted toward the housing 2 by the restricting part 5c, the cancel lever 4 is retuned to the initial position.

Although not illustrated, when the manipulation lever 3 is swung to the right-turn indicating position, the cancel protrusion engaging part 42 of the cancel lever 4 advances to the rotation path of the cancel protrusion engaging part 42 and the manipulation lever 3 is locked at the right-turn indicating position by the latch mechanism, as when the manipulation lever 3 is swung to the left-turn indicating position.

When the driver rotates the steering wheel to return it to the neutral position, the shaft 100 is also rotated and the cancel protrusion 512 swings the cancel protrusion engaging part 42, placing the cancel protrusion engaging part 42 in a state illustrated in FIG. 9A. Due to the swinging of the cancel protrusion engaging part 42, the cancel lever 4 swings the holding body 5 together with the lever driving plate 6, releasing the lock of the latch mechanism. Therefore, the holding body 5 is swung around the rotational axis 5a in the direction indicated by the arrow A1 in FIG. 11A. The manipulation lever 3 is automatically returned to the neutral position by the latch mechanism. During the return, the cancel protrusion engaging part 42 proceeds onto the cancel surface 512A of the cancel protrusion 512 and slides on the cancel surface 512A. Since the restricted part 41B of the cancel lever 4 is retracted toward the housing 2 by the restricting part 5c, the cancel lever 4 is retuned to the initial position.

According to this embodiment, even if the cancel protrusion 512 of the cancel cam member 511 to be assembled to the shaft 100 is moved in the axial direction of the shaft 100, the cancel protrusion engaging part 42 of the cancel lever 4 can still be aligned to the cancel protrusion 512. That is, since the cancel protrusion 512 of the cancel cam member 511 to be assembled to the shaft 100 does not need to be aligned to the lever body 40 of the cancel lever 4, the degree of freedom in the assembling of the rotational angle detecting device 52 to the shaft 100 can be assured, enabling a reduction in the entire width of all parts attached to the steering column in its axial direction.

Figure 12:
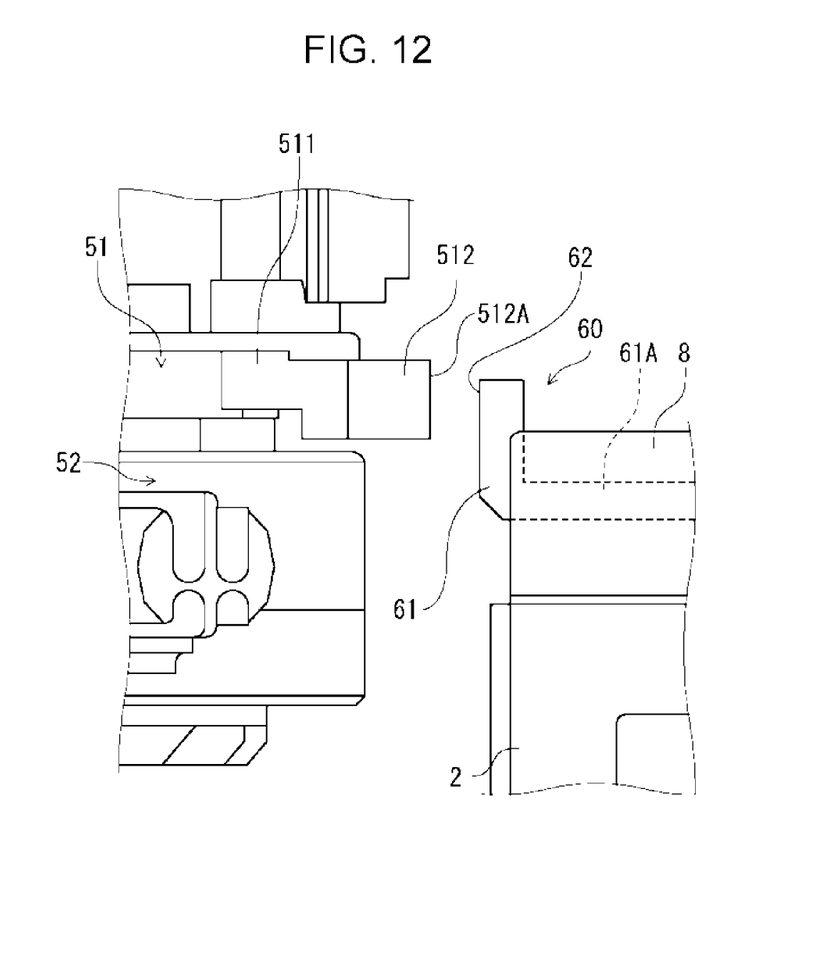
FIG. 12 is an enlarged side view illustrating a relationship between the cancel protrusion engaging part of a cancel lever and a cancel protrusion in a turn signal switch device in another embodiment of the present invention.

FIG. 12 illustrates a turn signal switch device 60 in another embodiment of the present invention. The turn signal switch device 60 has the same structure as in the embodiment described above, except the shape of the cancel protrusion engaging part 62 of a cancel lever 61, so components that are the same as in the above embodiment will be assigned the same reference numerals and detailed descriptions will be omitted.

In the turn signal switch device 60, the cancel protrusion engaging part 62 at the front end of the cancel lever 61 is preferably provided at the front end of an L shape formed by bending the front end of the cancel lever 61 in the axial direction of the shaft 100. The cancel protrusion engaging part 62 is disposed at a position offset from a lever main body 61A in the axial direction of the shaft 100. When the turn signal switch device 60 is assembled to the steering column device 50, the cancel protrusion engaging part 62 can be placed at a position at which the cancel protrusion engaging part 62 faces the cam surface 512A of the cancel protrusion 512.

In this structure as well, since the cancel protrusion 512 of the cancel cam member 511 to be assembled to the shaft 100 does not need to be aligned to the lever main body 61A of the cancel lever 61, the degree of freedom in the assembling of the rotational angle detecting device 52 to the shaft 100 can be assured, enabling a reduction in the entire width of all parts attached to the steering column in its axial direction, as in the turn signal switch device 1 in the embodiment described above.

Since the cancel protrusion engaging part 62 can be formed just by bending the front end of the cancel lever 61, the cancel protrusion engaging part 62 can be formed easily.

The present invention is not limited to the embodiments descried above.

That is, a person having ordinary skill in the art may make various modifications, combinations, sub-combinations, and replacements for the constituent elements in the above embodiments, without departing from the technical range of the present invention or an equivalent range of the technical range.

In the embodiments describe above, the cancel levers 4 and 61 are caught by the lever driving plate 6, which is moved forwardly and backwardly, and the lever driving plate 6 slides on the holding body 5 to prevent a cancel jam. In the present invention, however, a combination of the cancel lever 4 and lever driving plate 6 and a combination of the cancel lever 61 and lever driving plate 6 may be formed as a single unit and another part may move to prevent a cancel jam. In addition, if the rotation of the cancel levers 4 and 61 is driven by the cancel protrusion 512 of the cancel cam member 511 and the rotation releases the lock of the manipulation lever 3, the same effect as in the present invention can be obtained by applying the present invention.

The present invention can be applied to a turn signal switch device having a manipulation lever.

What is claimed is:

1. A turn signal switch device comprising:

a steering shaft;

a manipulation lever swingable to a left-turn indicating position or a right-turn indicating position through a neutral position, the manipulation lever being automatically returned to the neutral position from one of the left-turn indicating position or the right-turn indicating position as the steering shaft is rotated;

a holding body that holds a bottom end of the manipulation lever, the holding body being swingable together with the manipulation lever;

a housing that swingably supports the holding body;

a lever guide member attached to the housing;

a cancel lever supported by the lever guide member so that a front end of the cancel lever is movable toward and away from the steering shaft when the manipulation lever is manipulated so as to swing, the cancel lever having a lever body; and a cancel cam member that rotates together with the steering shaft, the cancel cam having a cancel protrusion; wherein:

a cancel protrusion engaging part is disposed at the front end of the cancel lever so as to be able to advance and retract to and from a rotation path of the cancel protrusion of the cancel cam member, and the cancel protrusion engaging part is disposed at a position offset from the lever body of the cancel lever in an axial direction of the steering shaft;

wherein the cancel protrusion engaging part comprises a bent portion provided at a front end, the bent portion of the engaging part comprising a bent portion of the cancel lever bent in the axial direction of the steering shaft and a bent portion of the cancel lever bent toward the steering shaft;

wherein the lever guide member comprises a lever guide hole so that the cancel protrusion engaging part protrudes from the housing and is swingable and movable reciprocally; and wherein the lever guide member comprises an insertion hole that communicates with the lever guide hole, and the bent portion of the engaging part is inserted into the insertion hole such that the insertion hole is used to assemble the cancel protrusion engaging part to the lever guide hole when the cancel lever is incorporated.

2. The turn signal switch device according to claim 1, wherein the insertion hole is at a position outside a movable range of the cancel protrusion engaging part in the lever guide hole.

3. The turn signal switch device according to claim 1, wherein a lever stopping part, which stops a backward movement of the cancel protrusion engaging part, is in the lever guide hole.

* * * * *